(12) United States Patent
Sturhan

(10) Patent No.: US 12,261,855 B2
(45) Date of Patent: Mar. 25, 2025

(54) PROCEDURES FOR IMPROVING SECURITY IN AN ELECTRONIC COMMUNICATIONS NETWORK

(71) Applicant: Cybersense GmbH, Dortmund (DE)

(72) Inventor: Ralf Sturhan, Dortmund (DE)

(73) Assignee: Cybersense GmbH, Dortmund (DE)

( * ) Notice: Subject to any disclaimer, the term of this patent is extended or adjusted under 35 U.S.C. 154(b) by 115 days.

(21) Appl. No.: 17/698,475

(22) Filed: Mar. 18, 2022

(65) Prior Publication Data

US 2022/0353278 A1    Nov. 3, 2022

(30) Foreign Application Priority Data

Mar. 19, 2021   (DE) .......................... 102021106823.1

(51) Int. Cl.
   *H04L 9/40* (2022.01)
(52) U.S. Cl.
   CPC ...... *H04L 63/1416* (2013.01); *H04L 63/1433* (2013.01); *H04L 63/1491* (2013.01)
(58) Field of Classification Search
   CPC ............. H04L 63/1416; H04L 63/1433; H04L 63/1491
   See application file for complete search history.

(56) References Cited

U.S. PATENT DOCUMENTS

| | | | | |
|---|---|---|---|---|
| 10,277,629 B1 * | 4/2019 | Guntur | ................ | H04L 63/1491 |
| 10,735,430 B1 * | 8/2020 | Stoler | ..................... | H04L 63/10 |
| 10,972,503 B1 * | 4/2021 | Mohan | ................ | H04L 63/1491 |
| 11,038,919 B1 * | 6/2021 | Sellers | ................ | H04L 63/1491 |
| 11,038,920 B1 * | 6/2021 | Sellers | ................ | H04L 63/1491 |
| 11,303,675 B1 * | 4/2022 | Sellers | ................ | H04L 63/1491 |
| 11,777,988 B1 * | 10/2023 | Lin | ..................... | H04L 63/1491 726/22 |
| 2009/0328216 A1 * | 12/2009 | Rafalovich | ......... | H04L 63/1491 726/23 |
| 2016/0359905 A1 * | 12/2016 | Touboul | .............. | H04L 63/1491 |

FOREIGN PATENT DOCUMENTS

CN              112235283 A  *  1/2021  ........... H04L 41/145

* cited by examiner

*Primary Examiner* — Richard G Keehn
(74) *Attorney, Agent, or Firm* — Adams and Reese LLP; John H Scott, III

(57) ABSTRACT

The invention relates to a method for improving the security in an electronic communication network, in which lures and decoys are distributed in the communication network. The aim of the invention is that of providing a systemisation for the selection and positioning of lures and decoys, by means of which the lures and decoys are distributed as optimally as possible in the communication network. For this purpose, the invention proposes that an attack vector on the communication network be determined, an attack graph (1) be created on the basis of the attack vector, which graph shows possible attack paths as acyclic directed graphs, the type and the number of lures and decoys be determined on the basis of the structure of the attack graph, and the lures and the decoys be distributed in the communication network using a target function, wherein the target function takes account of parameters which detects, as quickly as possible and with as high a likelihood as possible, an attacker (4), using the available lures and decoys, and allows for an assessment of the distribution.

5 Claims, 4 Drawing Sheets

PROCEDURES FOR IMPROVING SECURITY IN AN ELECTRONIC COMMUNICATIONS NETWORK

Figure 1:
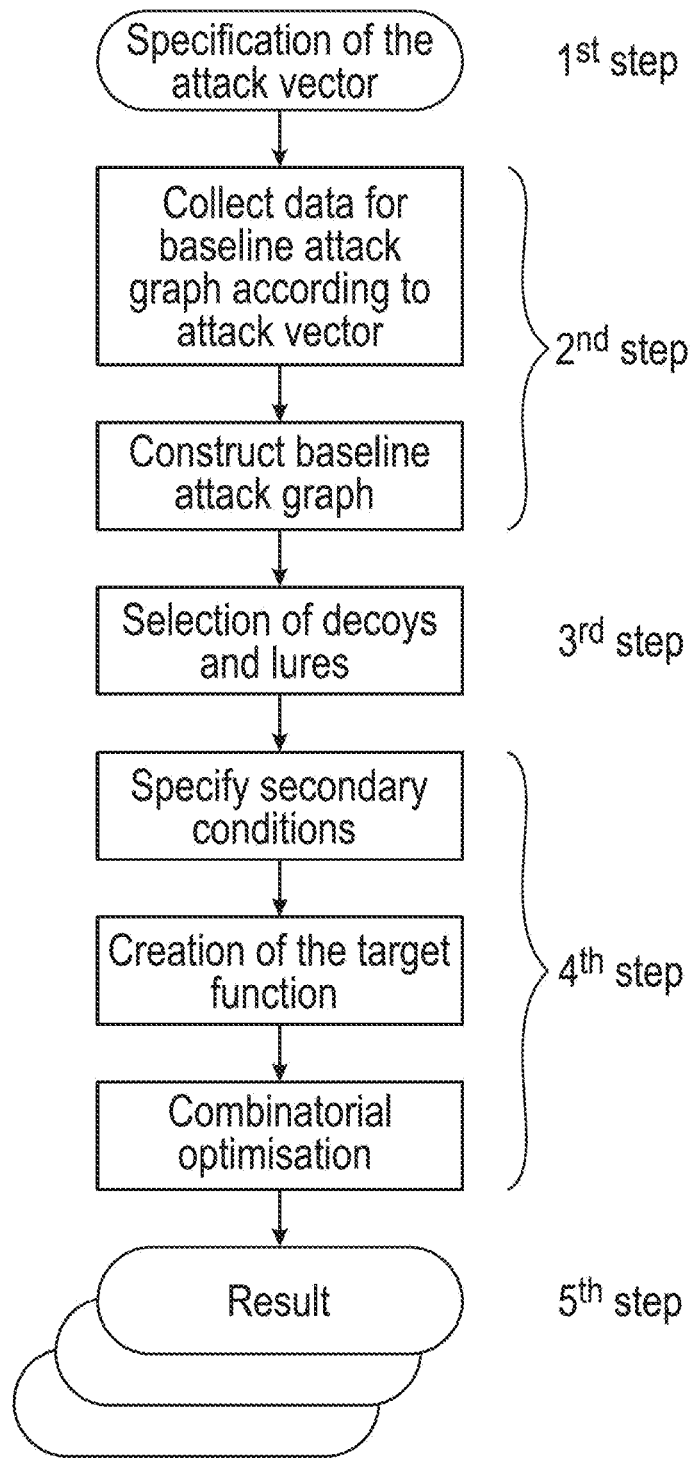

The invention relates to a method for improving the security in an electronic communication network using deception technology, in which lures and decoys are distributed in the communication network, in order to detect an attacker in the communication network.

Methods of this kind, which use what is known as deception technology, serve to avert and identify cyber-attacks. The aim is to entice attackers into traps (decoys) using bait (lures, also referred to as breadcrumbs). In this case, an attacker has already successfully infiltrated a network, has achieved persistency, and has sometimes already acquired control over one or more devices. However, the attack carried out could not be identified and located using other methods. If the use of the lures, or interaction with the decoys, is then ascertained, the attack can be identified and located. A method of this kind is known for example from the document U.S. Pat. No. 9,807,115 B2.

A plurality of possible decoys and lures exist, as well as possibilities for their distribution, restricted only by the inventiveness of the defender, and the conditions of the communication network to be defended. Decoys can for example constitute services, server systems, or industrial controllers. Lures may be, inter glia, Active Directory objects (GPOs, SPNs, accounts), cookies, stored access data, or certificates.

However, the prior art is lacking a systematic approach regarding which decoys and lures to expediently select, and where these are to be positioned. It is also important to be able to assess the change which results from the selection and positioning of the decoys and lures. It is possible to measure the degree of improvement between the state before and after application of a possible variant of decoys and lures, in view of the sought aim, an expedient selection between the variants can be made.

Both—a systematisation for the selection and positioning, as well as the assessable nature—are decisive prerequisites for transferring the task into an optimisation problem, which makes use of mathematical solution approaches, machine learning algorithms, or generative programming.

The object of the invention is therefore that of providing a systemisation for the selection and positioning of lures and decoys, by means of which the lures and decoys are distributed as optimally as possible in the communication network, in order to detect an attack as effectively as possible.

For this purpose, the invention proposes, proceeding from a method of the type mentioned at the outset, that an attack vector on the communications network is determined, an attack graph is drawn up, on the basis of the attack vector, which graph shows possible weak points and attack paths as acyclic, i.e. non-circular, directed graphs having at least one sink representing the target, and at least one source representing the weak point, the type and the number of lures and decoys be determined on the basis of the structure of the attack graph, and the lures and decoys are distributed in the communication network using a target function, wherein the target function takes into account the following parameters:

a) shorter paths to the target or the targets of the attack graph are particularly attractive for attackers, b) a decoy is placed on as many paths as possible to the target or the targets of the attack graph, c) the lures and decoys are arranged as close as possible to the weak points of the attack graph, wherein a new attack graph is created by the distribution of the lures and decoys, and wherein subsequently the original attack graph is compared with the newly created attack graph, and the change is assessed.

Thus, in the method according to the invention, initially deception technology is used in order to select and distribute lures and decoys in an optimized manner, on the basis of a previously created attack graph.

In this case, the attack graph is modelled as an acyclic, directed graph, the sinks of which are the attacker's goal.

The distribution of decoys and lures in the environment to be protected changes the original attack graph. An improvement in the sense of the defender is achieved if the possible paths in new attack graphs now lead sooner, more quickly and more often via lures and decoys, and thus make it possible for the attack to be identified earlier and more reliably. The degree of improvement results from the comparison of the original attack graph and the attack graph changed by the application of the lures and decoys. The value of the target function, determined in the process, is a measure for the improvement, and makes it possible to compare and assess different solutions.

According to a development of the method according to the invention, at least two attack vectors are specified, from which in each case one attack graph is drawn up, and the positioning of the lures and decoys in the respective attack graphs is overlaid. As a result, different types of attacks can be taken into account. At the same time, use is made of common structures during positioning, and redundancy is avoided. This makes the detection of the attack even more effective.

In addition, it is advantageous if the complexity of the application of lures and decoys is used as a further parameter in the target function. The technical complexity of the positioning of the lures and decoys in the network varies. Therefore, different positionings are also associated with different costs. The cost optimisation is therefore also taken into account in the target function.

According to a particularly expedient development of the invention, machine learning methods are used when carrying out the method. The distribution of the lures and decoys can be continuously and automatically improved by this measure. The implementation of machine learning methods using statistical methods is made possible by the assessable nature of the results, according to the invention.

Figure 2:
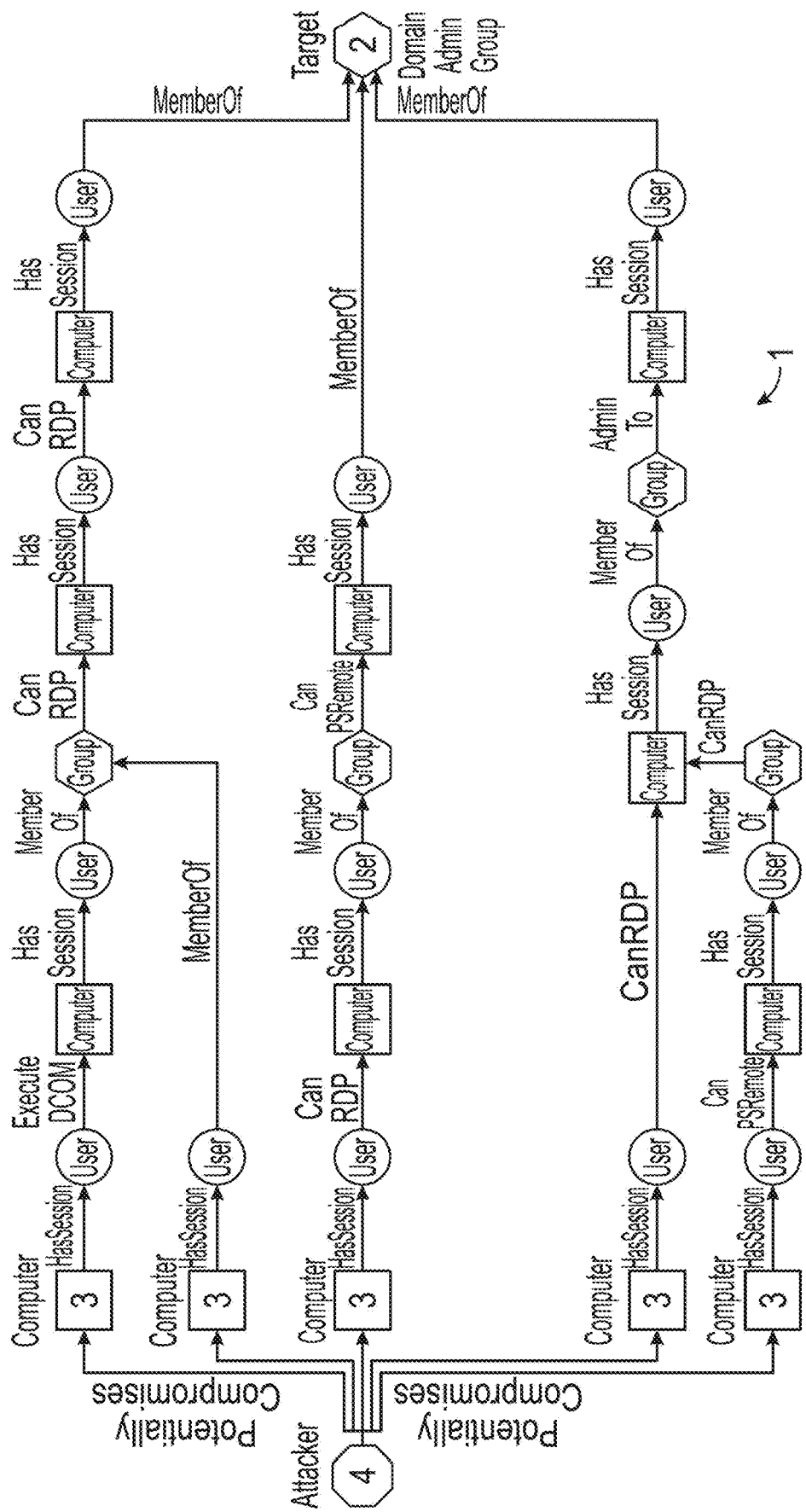
Figure 3:
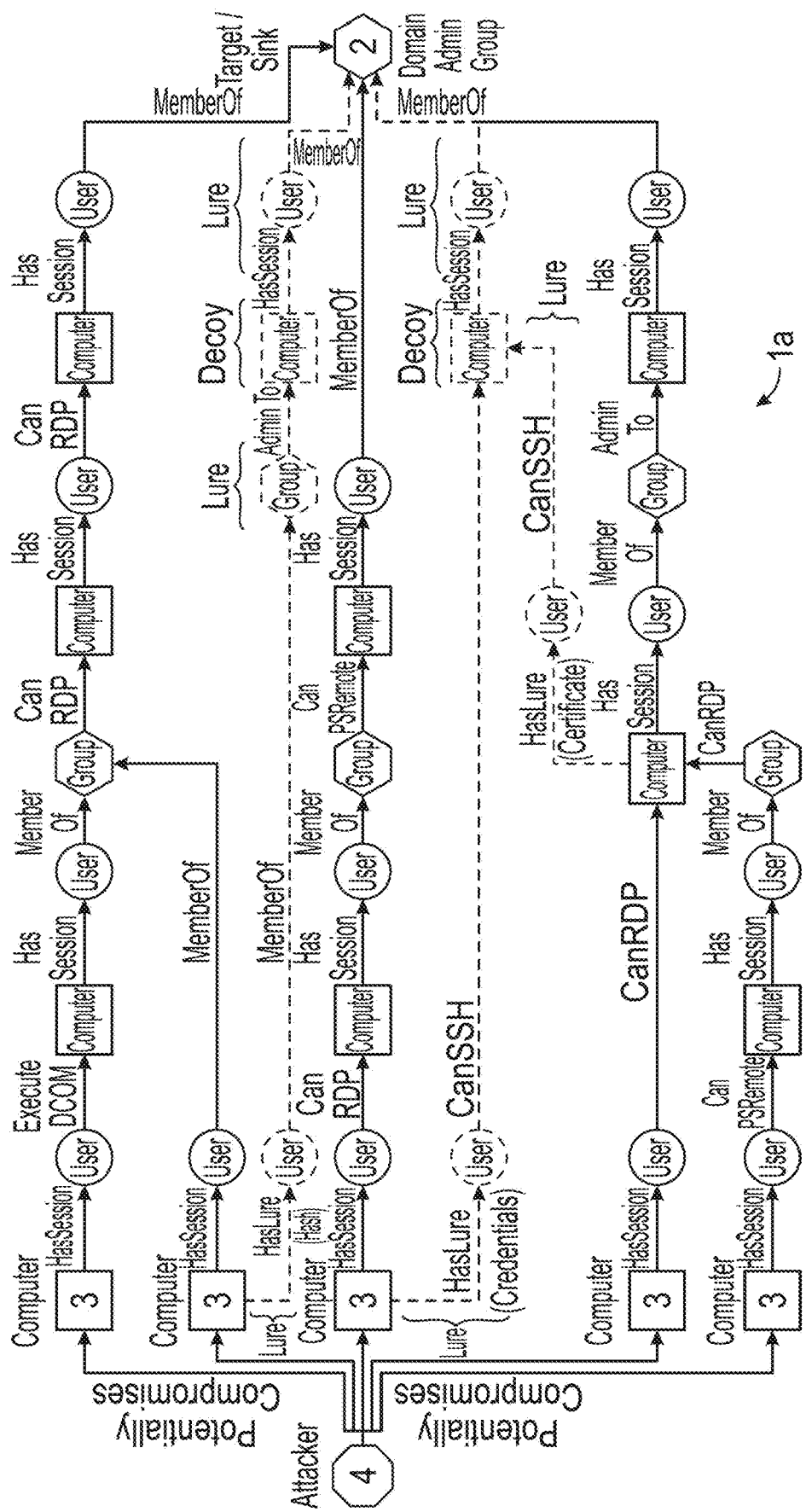
Figure 4:
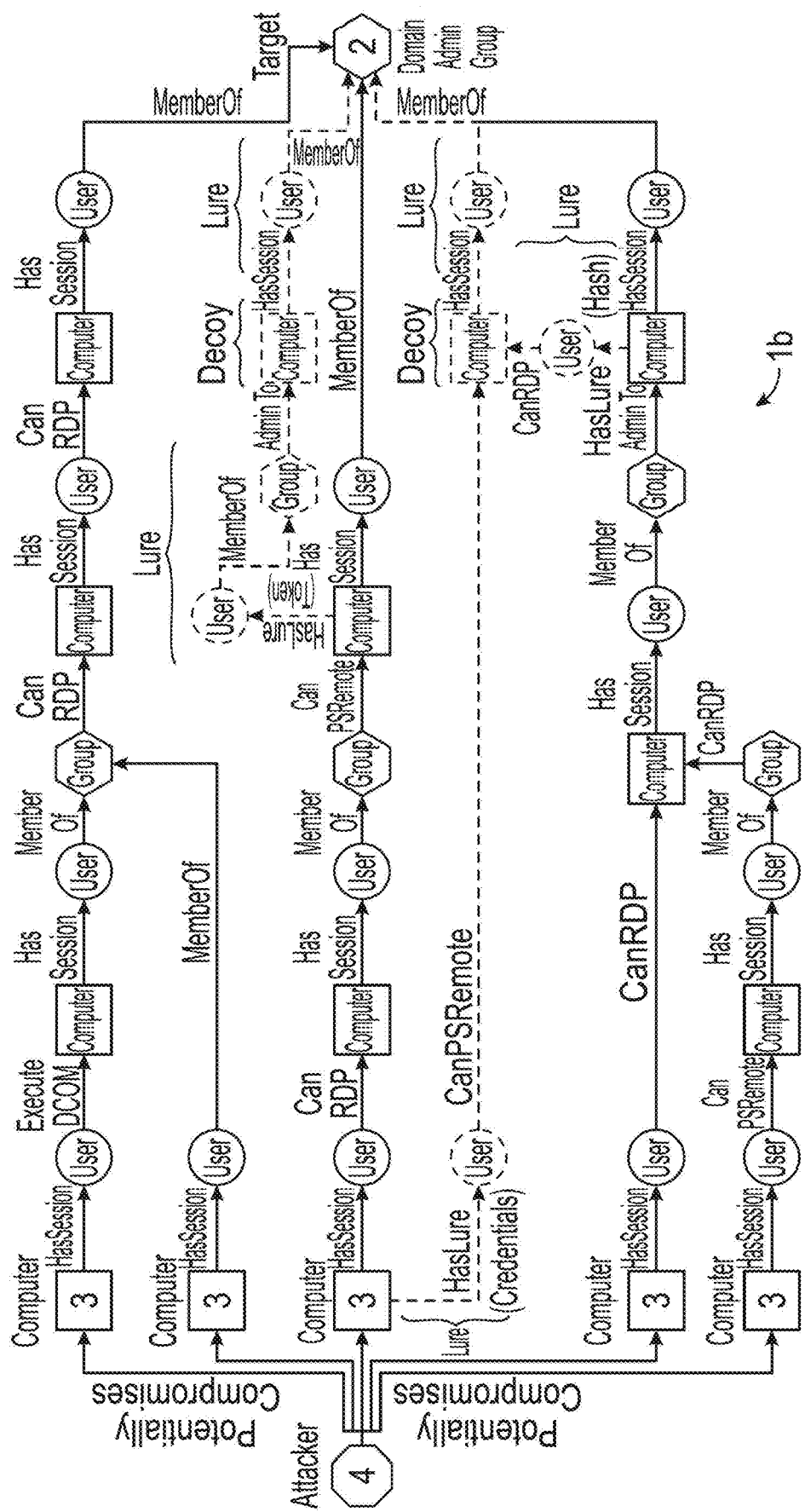

The invention will be explained in greater detail in the following, with reference to the drawings, in which:

FIG. 1: is a schematic flow diagram of the method according to the invention, in one embodiment;

FIG. 2: schematically shows an attack graph prior to application of the lures the decoys;

FIG. 3: schematically shows the attack graph from FIG. 2 after distribution of the lures and decoys, in a first variant;

FIG. 4: schematically shows the attack graph from FIG. 2 after distribution of the lures and decoys, in a second variant.

FIG. 1 shows the way in which the type, number and positioning of decoys and lures can be specified, assessed and optimised by the method according to the invention, on the basis of mathematical models, taking the example of graph theory.

The route of the attacker along their attack vector can be interpreted as a path along the edges (in part lures) and nodes (in part decoys) of a graph, wherein the nature of the edges (network connections, pipes, rights relations, or the like) and nodes (systems, services, or the like) follows from the attack vector. These paths are modelled as attack graphs. Hitherto, although these attack graphs have already been used for analysing and identifying desirable configuration changes (cf. for example "P. Ammann, D. Wijesekera and S. Kaushik, "Scalable, Graph-Based Network Vulnerability Analysis," ACSAC, 2002"), they have not yet been applied to the problem of the selection and positioning of decoys and lures, or the deception technology in general.

1st Step: Specification of the Attack Vector

In a first step of the method according to the invention, an attack vector is specified. The activities of an attacker can be divided into the categories of recce (reconnaissance), planning (plan) and action (act). In this case, the sequence is not decisive, and all phases can be passed through several times. In this case, the information found in the recce phases influences the type and the selected path of the attack—referred to as the attack vector. The task of deception technology is that of influencing the information found, in a manner appropriate for the attack vector, such that the selected path leads over a decoy as early as possible, or information from a lure is used, the use of which can be ascertained in another manner.

2nd Step: Creation of the Attack Graph

In order to later be able to ascertain and assess a change, in the second step of the method according to the invention attack graphs are drawn up taking into account the attack vectors for the existing surroundings, prior to the application of decoys and lures. This can be illustrated on the basis of the example of the known "Identity Snowball" attacks (cf. for example "P. Ammann, D. Wijesekera and S. Kaushik, "Scalable, Graph-Based Network Vulnerability Analysis," ACSAC, 2002"). In this case, an attacker acquires greater rights in that they assume and exploit new identities, in a stepwise manner, in order to compromise further computers and identities. This attack technique has for many years been an essential tool for human attackers (APTs) and automated attacks using malware (Emotet/TrickBot). In this case, it is important that this attack technique is not based on the exploitation of programming errors, which could be closed using a patch, but rather makes use of fundamental mechanics of systems such as Microsofts Active Directory, Kerberos or NTLM, and is difficult to detect using conventional means. It is an important area of application for deception technology. Proceeding from the attack vector, the existing surroundings can be shown in an attack graph, in which the nodes represent domains, user accounts, computers, groups, group policies, and organisational units, and the directed edges constitute rights relations and active sessions (AdminTo, Trusted By, HasSession, GenericAll, AllExtendedRights, AllowedtoDelegate, Owns, GetChangesAll, etc.). Established tools exist for the data collection, construction and storage of such attack graphs (cf. for example R. Vazarkar, S. Heiniger and nikallass, "SharpHound3," [Online]. Available: https://github.com/BloodHoundAD/SharpHound3). Their high level of relevance also results from the degree of their prevalence among attackers and security experts.

For the example of the "Identity Snowball" attack (see above) with the aim of acquiring the highest level rights in the attacked structure, initially an acyclic directed graph is created from the obtained data, the sink of which graph is the group of the "Domain Administrators." The sources of the graph represent possible weak points. The paths from the sources to the sinks represent the possible attack paths. Attackers use tools such as "BloodHound" (cf. A. Robbins, R. Vazarkar and W. Schroeder, "BloodHound," [Online]. Available: https://github.com/BloodHoundAD/BloodHound), in order to create acyclic directed graphs and find optimal attack paths.

3rd Step: Selection of the Lures and Decoys

Just as the attack vector specifies the model of the attack graph, the model of the attack graph determines the selection of decoys and lures. On the basis of the example of the "identity Snowball" attack vector (see above), the decoys are computers, and the lures are user accounts, computers, groups, group policies, and organisational units, which are configured such that they are suitable for changing the structure of the attack graph. Other decoys and lures are not taken into account for this specific attack vector.

4th Step: Creation of the Parameters of the Target Function

In order to find the optimal positioning of decoys and lures, methods of combinatorial optimisation are applied, which select, from the set of possible distributions, those having the optimal target function value. In this case, in this embodiment inter alia upper limits of the number of decoys and lures in relation to the size and complexity of the target surroundings to be protected are taken into account as parameters.

These trees are changed by the application of decoys and lures. According to the invention, the aim is to guide the attacker's path over one of the applied decoys, and to thus detect the attack. Therefore, in this case, the target function takes into account the following parameters:

Shorter paths are more attractive for the attacker. Every additional node increases the complexity and the risk of discovery.

Not all the edges (lures) have the same costs. The path over an edge can be weighted according to how technically easy it is for an attacker to pursue, and the risk of detection with which it is associated.

The more attractive a path, the more important it is for it to lead over a decoy or a detectable lure.

As many paths as possible should lead over a decoy or a detectable lure (weighted according to the attractiveness of the paths).

The earlier (i.e. the closer to a weak point) a decoy or a detectable lure is positioned, the better.

On the basis of the target function value, the individual attack graphs and the distribution of decoys and lures, on which they are based, can be assessed and compared. An optimal solution is found by means of a suitable method of combinatorial optimisation, known in principle to a person skilled in the art.

The design of the heuristics and the approximation algorithms for solving the optimisation problem is assisted and automated in a development of the invention, by using machine learning. Current research suggests that this is possible for repeated tasks with different but similarly structured data (cf. R. Ancarani, "Not All Paths are Created Equal, Attackers' Economy (Part 1)," Aug. 11, 2019. [Online]. Available: https://riccardoancarani.github.io/2019-11-08-not-all-paths-are-equal/).

5th Step: Superimposition and Result

Attack graphs can be used for modelling a plurality of possible attack vectors, and thus serve as the basis for the optimised selection and distribution of decoys and lures. Thus, the procedure described above can also be applied to other conceivable attack vectors, and can in each case find an optimised partial solution. The partial solutions are subsequently superimposed to form an overall solution.

The overall result identified by the superimposition is a multidimensionally optimised defence on the basis of deception technology.

FIG. 2 shows a simplified attack graph which is denoted in its entirety by the reference sign 1. This was created as described above, in accordance with the method according to the invention, after the attack vector was determined. The attack graph is shown as an acyclic directed graph, in which a sink 2 represents the group of the domain administrators ("Domain Admin Group") the target of the potential attacker 4. Source 3 represents possible weak points for the potential attacker. These are for example computers in a modelled network. The sink 2 is to be reached, proceeding from the sources 3, via nodes and edges (shown by direction arrows).

After the creation of the attack graph, the available decoys (dashed lines) and lures (dotted lines) are subsequently determined. The decoys and lures are distributed on the basis of the target function according to the invention and the parameters thereof. Possible attack graphs 1a, 1b resulting therefrom are shown in FIGS. 3 and 4. If an attacker 4 now infiltrates the network via one of the sources 3 representing the possible weak points, the attack is detected if the attacker 4 encounters one of the applied decoys and thus "falls into the trap".

According to the invention, the attack graph developed in each case is assessed on the basis of the target function.

For the attack graphs, which are simplified here for reasons of clarity, edges have the same costs, and the detection is performed only on the decoys.

The target function is for example defined as follows:

$$\max A^* N_{sd} + B^* N_{md} + N_{rd} - N_p - E + M_p - M_d - M_{si} - M_{sd}$$

where
$N_{sd}$ is the number of paths comprising decoys, which are shorter than the shortest path without decoys.
is a weighting factor
$N_{md}$ is the number of paths comprising decoys, which are shorter than the average path length and greater than or equal to the minimum path length of the paths without decoys.
B is a weighting factor
$N_p$ is the number of paths without decoys
$N_d$ is the number of paths with decoys
$N_{rd}$ $N_p - N_{sd} - N_{md}$ (remaining paths with decoys)
E is the number of possible weak points
$M_p$ Ø length of the paths without decoy
$M_d$ Ø length of the paths with decoy
$M_{si}$ Ø distance from lures to weak points
$M_{sd}$ Ø distance from decoys to weak points Thus, for the variants according to FIG. 3 and FIG. 4 the following target function values result, the weighting factors having been set to A=10 and B=2:

Variant of FIG. 3:

$$10*3+2*0+1-5-5+9-6.75-2.75-4.00=16.50$$

Variant of FIG. 4:

$$10*1+2*0+1-5-5+9-9.75-4.25-7.75=-11.75$$

It thus follows, on the basis of the assessment, that the variant shown in FIG. 3 is more efficient, because the attacker is discovered on more paths, i.e. at a higher degree of likelihood, and earlier, because the decoys are positioned closer to the sources 3 than possible weak points.

The invention claimed is:

1. Method for improving the security of an electronic communication network using deception technology, in which lures and decoys are distributed in the communication network, in order to detect an attacker in the communication network, characterised in that an attack vector on the communications network is determined,
an attack graph is drawn up, on the basis of the attack vector, which graph shows possible weak points and attack paths as acyclic directed graphs having at least one sink representing the target, and at least one source representing the relevant weak point,
the type and the number of lures and decoys are determined on the basis of the structure of the attack graph, and
the lures and decoys are distributed in the communication network using a target function, wherein the target function takes into account the following parameters:
a) shorter paths to the target or the targets of the attack graph are particularly attractive for attackers;
b) a decoy is placed on as many paths as possible to the target or the targets of the attack graph; and
c) the lures and decoys are arranged as close as possible to the weak points of the attack graph,
wherein a new attack graph is created by the distribution of the lures and decoys, and wherein subsequently a comparison of the original attack graph with the newly created attack graph is carried out, and the change is assessed on the basis of the target function value.

2. Method according to claim 1, characterised in that at least two attack vectors are specified, from which in each case one attack graph is drawn up, and the positioning of the lures and decoys in the respective attack graphs is overlaid.

3. Method according to claim 1, characterised in that d) the complexity of the application of lures and decoys is used as a further parameter in the target function.

4. Method according to claim 1, characterised in that a plurality of iterations of the method according to claim 1 are passed through.

5. Method according to claim 1, characterised in that machine learning methods are used when carrying out the method.

* * * * *